No. 791,009. PATENTED MAY 30, 1905.
W. L. COOPER.
COMBINATION TOOL.
APPLICATION FILED MAY 11, 1904.
Fig.1.
Fig.2.
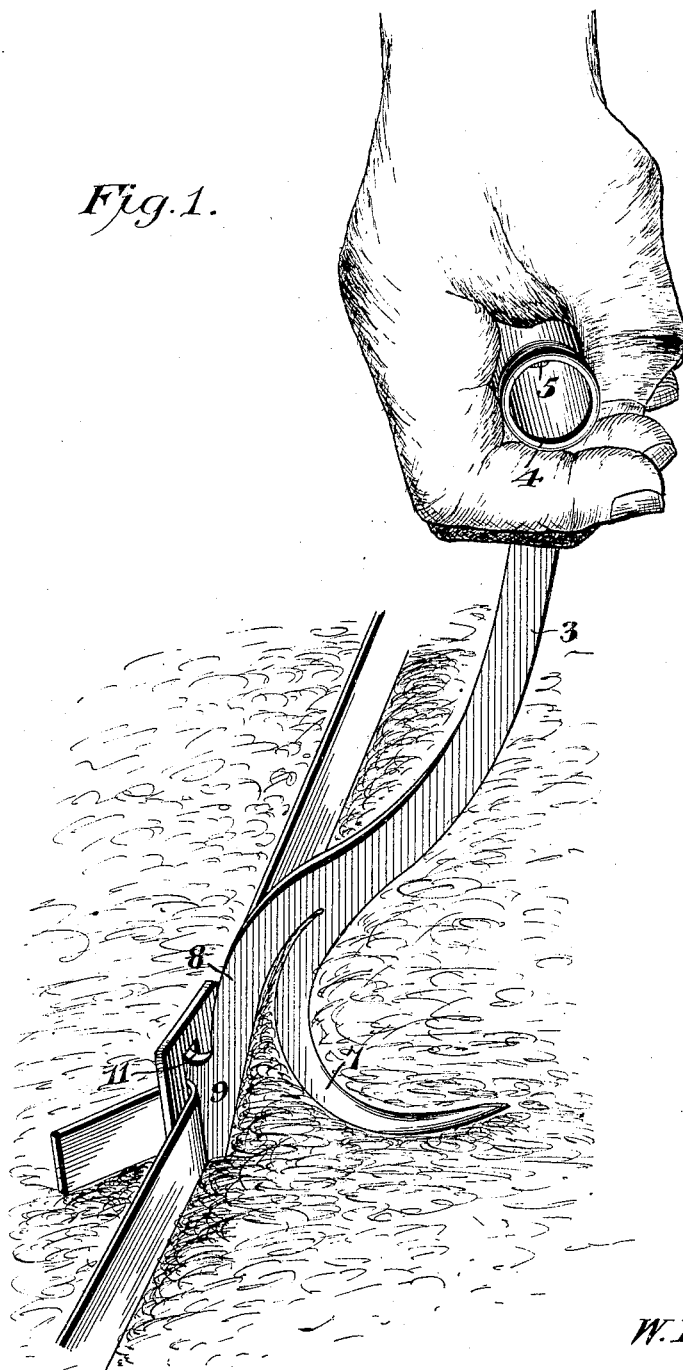
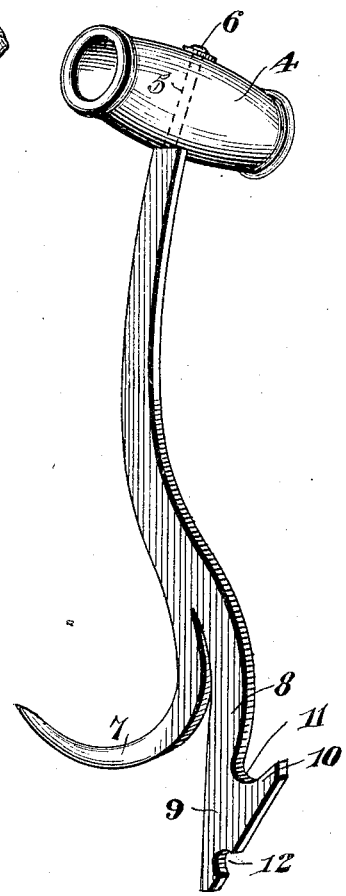
W. L. Cooper, Inventor
Witnesses
Jas. H. McCathran
B. G. Fritter
By C. G. Siggers
Attorney No. 791,009.                                    Patented May 30, 1905.

UNITED STATES PATENT OFFICE.

WILLARD LEE COOPER, OF AUGUSTA, GEORGIA.

COMBINATION-TOOL.

SPECIFICATION forming part of Letters Patent No. 791,009, dated May 30, 1905.

Application filed May 11, 1904. Serial No. 207,476.

*To all whom it may concern:*

Be it known that I, WILLARD LEE COOPER, a citizen of the United States, residing at Augusta, in the county of Richmond and State of Georgia, have invented a new and useful Combination-Tool, of which the following is a specification.

This invention is primarily intended for handling and opening cotton-bales, but is useful in connection with bales of other kinds that are secured with bands and buckles. The object is to provide a novel and simple implement by means of which bales may be handled and the bands thereof expeditiously unbuckled with ease.

A further object is to provide a device of this character that can be manufactured at small cost and which because of its simplicity may be made of great strength, so that the danger of breakage is reduced to a minimum.

The preferred embodiment of the invention is illustrated in the accompanying drawings, wherein—

Figure 1 is a perspective view showing the implement in use during the unbuckling of a band. Fig. 2 is a perspective view of the tool.

Similar reference-numerals indicate corresponding parts in both figures of the drawings.

In the embodiment illustrated a shank 3 is employed which is preferably reversely curved, as shown, and is provided at one end with a tranverse handle 4, that may, if desired, be tubular in form, as illustrated, the shank 3 having a reduced stem 5, that passes therethrough and is riveted, as shown at 6. The end of the shank 3 opposite the handle is bifurcated, and one of the arms, 7, thereof is formed into an outwardly-curved pointed hook. The other arm, 8, is provided at its free end with an enlarged buckle-engaging head 9, that tapers toward said free end. The head is thus substantially triangular in form, and its inner larger end has a hook 10, forming a buckle-receiving seat 11. The rear edge of the head is also provided with a seat 12, that is located contiguous to the free or small end of the head. It is to be observed that the head extends beyond the hook. The preferred manner of holding the hook is shown in Fig. 1, the handle being grasped with the shank extending between the second and third fingers and said fingers extending in the direction of the hook 7. In handling bales the hook 7 is of course employed in the usual manner.

When it is desired to detach the bands, the head 9 is engaged in the buckles thereof, and this is done without changing the position of the handle in the hand. The hook 10 of the head is passed through the usual opening of the buckle, and the latter is thereby received in the seat 11. The opposite portion of said buckle is likewise received in the seat 12, and consequently when the shank is raised, as illustrated in Fig. 1, the buckle is turned on edge, so that the free end of the band is released. The engagement of the head 9 with the buckle may be styled a "locking" engagement, in a broad aspect, or an "interlocking" engagement, in a more specific view; but in both cases the buckle and head are held from separating by a non-slipping detachable connection when in operation. In case the band has a long lap a further movement of the shank will cause the head to rise from the bale, the hook acting in the nature of a fulcrum, and in this manner even the fastenings with such long laps can be readily released. Furthermore, it is to be observed in this connection that there is a coaction between the hook 7 and the head 9.

Among the advantages resulting from the tool the following may be enumerated. With it a bale of cotton can be opened with much more ease and rapidity than by cutting the tie, and, furthermore, neither the tie nor the buckle is injured. The hook forming a part of the opener is always at hand to move the bale to any required position, and thus combines both tools in one. Moreover, said tools are used in conjunction, and either may be employed without having to change the position of the handle in the hand. Furthermore, as this tool does away with the necessity of cutting the tie considerable expense is obviated. It is ordinarily the practice to cut the ties and afterward rivet them together, thereby not only depreciating the value of the tie, but also adding the expense of the rivets and the time employed in riveting. Because of the extreme simplicity of the implement it may be made very strong, so that it is hardly possible to break the same with the leverage provided, yet this leverage is entirely sufficient for the work, and because of the cheapness in the cost of manufacture even breakage or loss is of small consequence.

While the buckle-engaging head and the bale-engaging hook are here combined, and this is the preferable and most highly advantageous arrangement, it must be understood that I do not wish to be limited to using the hook with the head under any and all circumstances, as a single tool could be provided embodying my improved buckle-engaging head alone.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a tool of the class described, a shank having a buckle-engaging head at one end provided with spaced buckle-receiving seats.

2. In a tool of the class described, a shank having a handle at one end, the other end of said shank terminating in a tapering buckle-engaging head having an offset upstanding hook portion.

3. In a tool of the class described, a shank having a transversely-disposed handle at one end and a buckle-engaging head located at the other end, said head tapering toward its free terminal and having the rear side of its larger end terminating in an upstanding hook, said head furthermore being provided in its rear side contiguous to its free end with a buckle-receiving seat.

4. In a tool of the class described, a shank having a head provided with means for interlocking with a bale-band buckle to turn the same when said shank is turned.

5. In a tool of the class described, a shank having a head provided with means for engaging in the opening of and interlocking with a bale-band buckle on opposite sides of said opening to turn the same when said shank is turned.

6. In a tool of the class described, a reversely-curved shank having a handle at one end, the opposite end of said shank being bifurcated, one arm thereof being formed into an outstanding curved hook, the other arm projecting beyond said hook and having a tapering buckle-engaging head provided with an upstanding hook portion and a buckle-receiving seat.

7. In a tool of the class described, a shank having a split terminal, one arm of which is formed into a hook, a head carried by the other arm, said head being arranged to engage in a bale-band-buckle opening, and having means for respectively engaging the opposite faces of the buckle on opposite sides of the opening to turn the same when said shank is turned.

8. In a tool of the class described, a shank having a split terminal, one arm of which is turned outwardly to form a bale-engaging hook, the other arm extending longitudinally of the shank and having a terminal head that projects laterally outward on the side opposite the hook, said head having means for interlocking with the bale-band buckle to turn the same when the said shank is turned.

9. In a tool of the class described, a shank having a head provided with a buckle-receiving seat and means for engaging in the opening of a bale-band buckle to turn the same when said shank is turned.

10. In a tool of the class described, a shank provided with a curved pointed hook constituting bale-engaging means, and opposite thereto a buckle-engaging head which is constructed to have a locking engagement with the buckle, the bale-engaging hook being outwardly turned and adapted to form a fulcrum for the tool in removing the buckle.

11. In a tool of the class described, a shank having a transversely-disposed handle at one end and a buckle-engaging head located at the other end, said head tapering toward its free terminal and provided in its rear side contiguous to its free end with a buckle-receiving seat.

In testimony that I claim the foregoing as my own I have hereto affixed my signature in the presence of two witnesses.

WILLARD LEE COOPER.

Witnesses:
THOMAS W. CAREY,
HERBERT F. MICHEL.